Dec. 22, 1942. H. S. GIPE 2,306,162
SOUND DEVICE
Filed Aug. 8, 1940 6 Sheets-Sheet 1

INVENTOR.
Harrison S. Gipe
BY F. H. Miller
ATTORNEY.

Dec. 22, 1942.   H. S. GIPE   2,306,162
SOUND DEVICE
Filed Aug. 8, 1940   6 Sheets-Sheet 2

INVENTOR.
Harrison S. Gipe
BY F. H. Miller
ATTORNEY.

Dec. 22, 1942.                H. S. GIPE                2,306,162
SOUND DEVICE
Filed Aug. 8, 1940                6 Sheets-Sheet 3

INVENTOR.
Harrison S. Gipe
BY
ATTORNEY.

Dec. 22, 1942.   H. S. GIPE   2,306,162
SOUND DEVICE
Filed Aug. 8, 1940   6 Sheets-Sheet 4

INVENTOR.
Harrison S. Gipe
BY
ATTORNEY.

Patented Dec. 22, 1942

2,306,162

UNITED STATES PATENT OFFICE 2,306,162

SOUND DEVICE

Harrison S. Gipe, West Lawn, Pa.

Application August 8, 1940, Serial No. 351,902

17 Claims. (Cl. 179—100.2)

My invention relates to sound devices, and particularly to devices of this character that utilize electromagnetism in receiving and translating, or recording and reproducing, sounds through the intermediary of magnetizable elements, such as filaments or wires.

A recording and reproducing device of this kind operates by subjecting a magnetizable record element to the effects of electromagnetism from pole means in accordance with sound variations, similarly to the maner of inscribing waves in accordance with sound on a wax record element with a needle or stylus, while the record member or wire travels lengthwise past the pole means. The pole means may therefore, be considered a stylus or styli, although inscribing or producing an invisible record.

Conversely, when the inscribed or affected element is moved past the stylus, the record may be reproduced and amplified.

Any variable quantity, to which electromagnetism may be caused to respond, may also be translated or recorded, and the translation or record utilized, so that uses of the invention applicable to such purposes are contemplated, irrespective of whether the intermediary or record element is a wire, a tape, a disk, or has other form.

In the approximately forty years of the electromagnetic recording art, prior to this invention, considerable difficulty has been encountered in satisfactorily utilizing a filamentary record element. This difficulty may have been slightly greater with wire than with tape, but, so far as I am aware, no element of either type has heretofore been highly successful.

Tape has obvious objections by reason of its flat section, its requirement to be in one exact position about its longitudinal axis, in its difficulty of handling, and in other respects.

Wire of circular cross section is a better known, and more easily handled, commodity, but it also, has not, prior to my invention, had success comparable to translators or recorders operating on other principles.

Former machines of the wire and other types, have been subject to sound distortion probably caused by absence of power modulation of certain magnetic flux impulses in certain frequency ranges independently of others, failure to eliminate peak flux impulses in all frequency ranges, ineffective recording in other features, and by friction, vibration and other causes.

The translator or record elements have been influenced by inexpedient magnetic fields or circuits, pole members of variable or excessive cross section and ineffective shape, position and control, poor magnetic conditioning, or timing of such conditioning, to receive a record, inadequate feed, the adverse effects of recording flux lag, the failure to effectively control the relative power of the recording fluxes, or to simultaneously produce separate recording fluxes in a stylus unit, the lack of good mechanical damping, and the absence of compact effective assembly of parts.

The machines, in general, have been adversely affected by excess weight, bulk, number and complexity of parts, and cost, shortness of the records, improper shape, proportion, location, relation, control and manipulation of means for supporting and exchanging a filament or wire, imperfect drive and change of drive direction, less effective direction of wire travel, gravity sag of the wire, inability to readily attach the wire to, and adjust it relative to, a reel, absence of wire feed or feed control means, lack of consideration of drive motor mounting in its effect on recording and reproducing functions, excess number of separate control elements and units, complicated manipulation, and other factors.

Among the objects of my invention are to overcome all of the above-mentioned difficulties, and to provide a device, and its elements, and the methods of construction, operation and control thereof, that shall result in improved translating or recording and reproducing qualities in the art stated.

Another object of the invention, particularly in combination in a magnetic receiving and translating, or recording and reproducing device, and of the wire type, is to modulate the power of pulsations of electromagnetic flux impulses of selected sound frequencies of a certain class, whereby to obtain improved magnetic arrangement in the recording or translating element, and better sound effects than only by modulation of pulsations of all electromagnetic flux frequencies in such class.

Another object of the invention, in such combination, is to eliminate flux peaks of sound impulses of all frequencies, and to subject the aforementioned modulator to the impulses having the peaks eliminated, whereby certain impulses may be impressed on the translating means increased or undiminished in power, and other impulses may be impressed on the translating means reduced in power.

Another object of my invention is to subject a magnetizable translating or record element to separately produced recording fluxes in producing a single record, to effect this result with a single recording entity or unit, and to provide recording means including a composite structure of magnetizable and non-magnetizable material in predetermined flux transmitting and controlling relation to each other.

Another object of the invention is to provide magnetic recording and reproducing stylus means of more effective and constant operating characteristics, not only in its construction and relation to other elements, but in being movable and located in predetermined manner for reducing wear and other advantageous effects.

Another object of the invention is to provide a more compact, effective head or unit, including the above-mentioned stylus, and providing for the ready renewal of the stylus and the translating or record element, improved magnetic circuits, means for removing objectionable influences of these circuits from the recording elements, novel conditioning and damping means for the recording element, and other features.

Another object of the invention is to provide means whereby a greater length of filamentary magnetizable record element may be provided in a given space, the element may travel in more effective direction and be more readily attached to, and adjusted on, and disconnected from, supporting means, and the latter may be easily removed and replaced.

Another object of the invention is to provide driven means for feeding the record element between reels for ensuring smoother, more uniform operation of the device, and means for readily detaching the feed means from a drive motor, for adjusting the reels by hand.

Another object of the invention is to provide a clutch that shall be automatically responsive to reversal of the movement of the motor drive element, for reversing the relation between the reels, as wherein one reel is driven and the other idles.

Another object of the invention is to provide combined damping and braking means for the reels whereby, when running, one of the reels is damped and, when stationary, both of the reels are held, and to provide, and to further combine, if desired, a novel master switch with the already combined damping and braking means.

Another object of the invention is to provide, in combination in a device of the above-indicated character, a motor mounting for preventing effects of vibration of the motor on the recording and reproducing flux functions.

Another object of the invention is to reduce the number, complexity, weight, bulk and cost of the elements of a magnetic recording device, whereby the latter as a whole may be correspondingly reduced, and constituted as a simple, portable unit containing all of the essential elements from power input to reproducing output, in a single, small cabinet, and having a record element of considerably greater length for the size and weight of the device than any previous magnetic recording machine of which I am aware.

Another object of the invention is to provide a device of the above-indicated character that shall greatly facilitate its manipulation, and be simple and durable in construction, economical to manufacture, and effective in its operation.

With such objects in view, as well as other advantages which may be incident to a utilization of the improvements, the invention comprises the elements and combinations thereof hereinafter set forth in the drawings, specification and claims, with the understanding that the several necessary elements constituting the same may be varied in proportion, arrangement and texture, without departing from the nature and scope of the invention.

In order to make the invention more clearly understood, means are shown in the accompanying drawings for carrying the same into practical effect, without limiting the improvements, in the useful applications thereof, to the particular constructions and operations, which, for the purpose of explanation, are made the subject of illustration.

Figure 1:
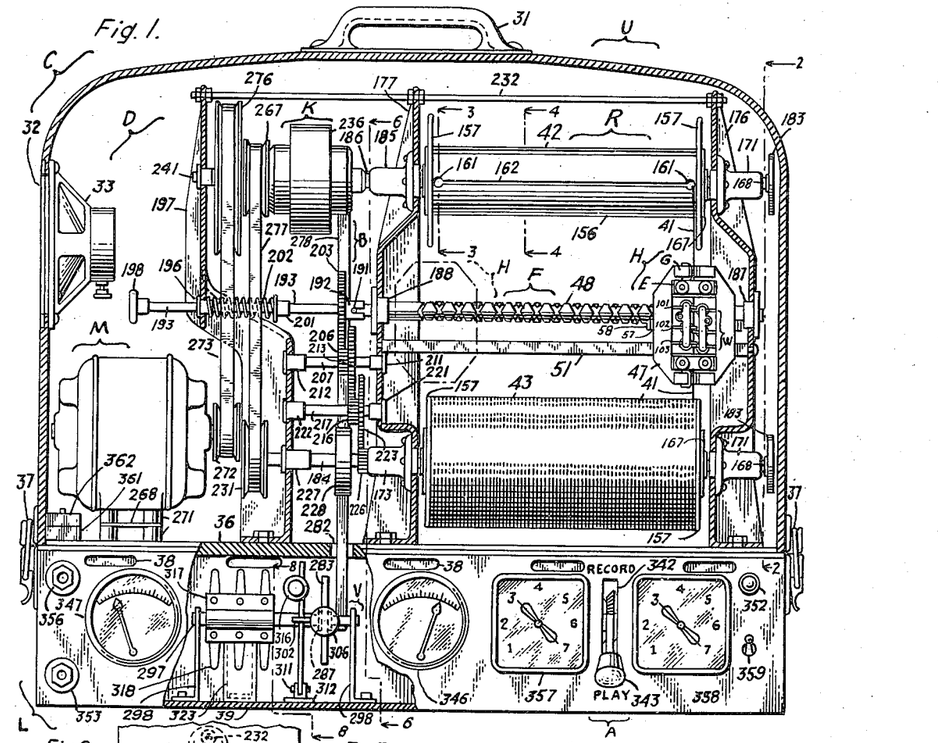
Figure 1 is a front view, on a reduced scale, partially in elevation, and partially in section, of one example of the invention, in the form of an electromagnetic recording and reproducing device, parts being broken away, and parts being omitted.

Referring to Fig. 1, in the example of the invention given, an entire electromagnetic recording and reproducing device, including all of the essential elements and controls, from power input to reproducing output, is enclosed in a single small cabinet C, having a top, or upper, compartment member or cover U, and a lower compartment or base structure L.

The device further comprises, in general, a recording head H, including recording pole members or styli W, wire damping structures E and G, wire supporting or reel structure R, mechanism F for feeding wire between reels of the structure R, a clutch K, a drive mechanism D, including a motor M and the clutch K, a combined braking and damping device B, a motor switch V, a master switch A, a flux frequency power modulator P, control circuits, and other elements to be hereinafter pointed out.

The cabinet

The cabinet C, drawn in this instance, to about one third actual scale, is substantially of suitcase character and proportions, and, with sufficient recording wire for about one hour operation of the device, and with all of the apparatus and control elements therein, as stated, weighs in the neighborhood of thirty five pounds. Having a handle 31, and being of very slight width, it may therefore, be very conveniently carried, like a suit case of desirable proportions, by an average operator.

Figures 2, 3, 4, 5:
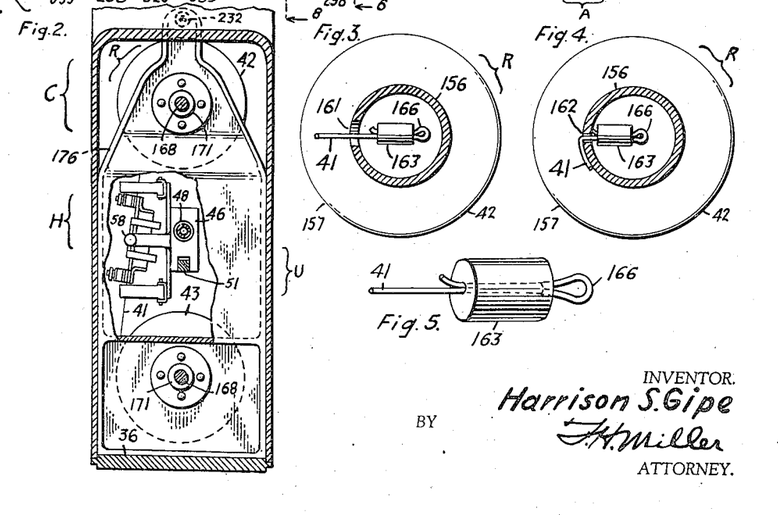
Fig. 2 is a view, taken substantially along the line 2—2 of Fig. 1, showing portion of the structure thereof.
Fig. 3 is an enlarged detailed sectional view, taken along the line 3—3 of Fig. 1, of a reel and means for attaching a wire or record element thereto.
Fig. 4 is a view, similar to Fig. 3, and taken along the line 4—4 of Fig. 1, showing another phase of the operation of the structure of Fig. 3.
Fig. 5 is a perspective detail view, on a further enlarged scale, of elements seen in Figs. 3 and 4.

In the example given, it is about six inches wide, as indicated in Fig. 2, and fourteen inches long, and sixteen inches high, as indicated in Fig. 1. It is shaped and finished for ornate appearance, and is made of light-weight material, such as cast aluminum, thin-ply wood, or composition, having appropriate surface finish or treatment.

The top compartment or cover member U is of simple construction, as indicated, having an aperture 32, at the upper left end, as seen in Fig. 1, for register with a so-called loud speaker 33 secured to the cover therein, and a bottom edge fitted to an upper rabbet edge groove of an intermediate partition 36 that is normally secured to the lower compartment member L. Clasps or locks 37 provide for readily removably, but securely and safely, attaching the cover to the lower compartment member L.

The lower compartment structure L is of similar thin-wall construction and material, having ventilating openings 38, a bottom wall 39, an upper edge fitting a lower rabbet groove edge of the partition 36, and slots and other apertures for further instrumentalities, as will appear.

The recording head

The recording head H, indicated in Fig. 1, but as better shown in Figs. 14 to 23, inclusive, is the device for immediate cooperation with a magnetizable record member, translating element, or wire 41 extending generally in the vertical direction between upper and lower reels 42 and 43, respectively, of the reel structure R, between which it is reciprocally transferred for winding on, and unwinding from, one or the other.

Figure 15:
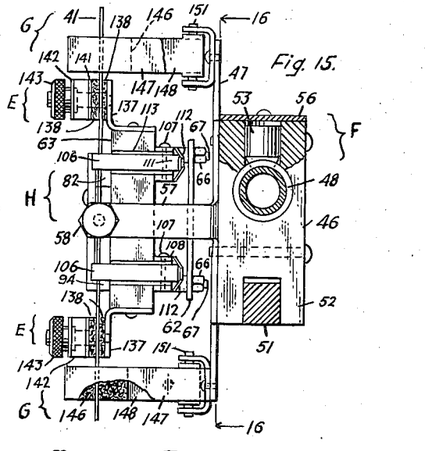
Fig. 15 is a view, taken at right angles to Fig. 14.
Figure 17:
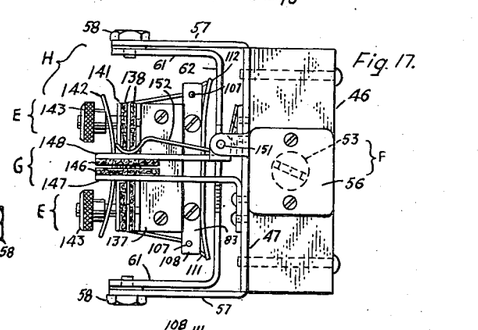
Fig. 17 is a top plan view of the structure of Fig. 15.

The head H comprises a carriage including a traveling nut 46, Figs. 15 and 17, secured to a non-magnetic frame member 47, and adapted for cooperation with a reverse or cross thread screw 48 in the form of a tube for lightness of weight. A guide bar 51 is accurately slidably fitted by a bifurcated lower portion 52 of the nut 46 for causing the head to travel smoothly and quietly, in a fixed path, back and forth parallel to the reels 42 and 43 between the extreme turns of the wire on the reels.

A floating pawl or dog 53, maintained in the nut 46 by a cover plate 56, has a lower end rib or tongue fitting the thread grooves of the screw 48, and is freely pivotal about its vertical axis, whereby, upon traveling to either end position of the head relative to the reels, it strikes a reverse pitch screw thread portion, and is thereby positioned for instant return movement of the head. The screw thread pitches, and the rate of rotation of the screw, are in accurate accord with the rate of travel of the recording wire 41, so that the latter is very evenly laid to one reel, and taken from the other.

The frame 47 has forwardly projecting side arms 57 carrying non-magnetic pivot screws 58 having alined horizontal axes through the longitudinal axis of the wire 41, and on which are pivotally mounted arms 61 of a cruciform non-magnetic bracket 62. As better seen in Fig. 21, the bracket 62 is secured to a light-weight non-magnetic block 63, of material such as aluminum, by nuts 66 and special screws 67 having other purpose.

Figures 19, 20:
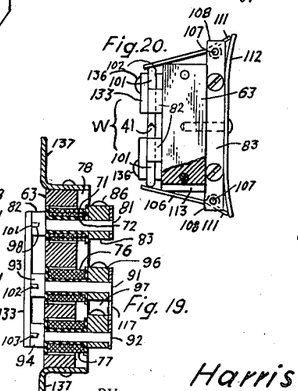
Fig. 19 is a view taken substantially along the line 19—19 of Fig. 18, parts being omitted.
Fig. 20 is a top view, partially in plan, and partially in section, taken substantially along the line 20—20 of Fig. 18, and viewed in the direction of Fig. 17.
Figure 26:
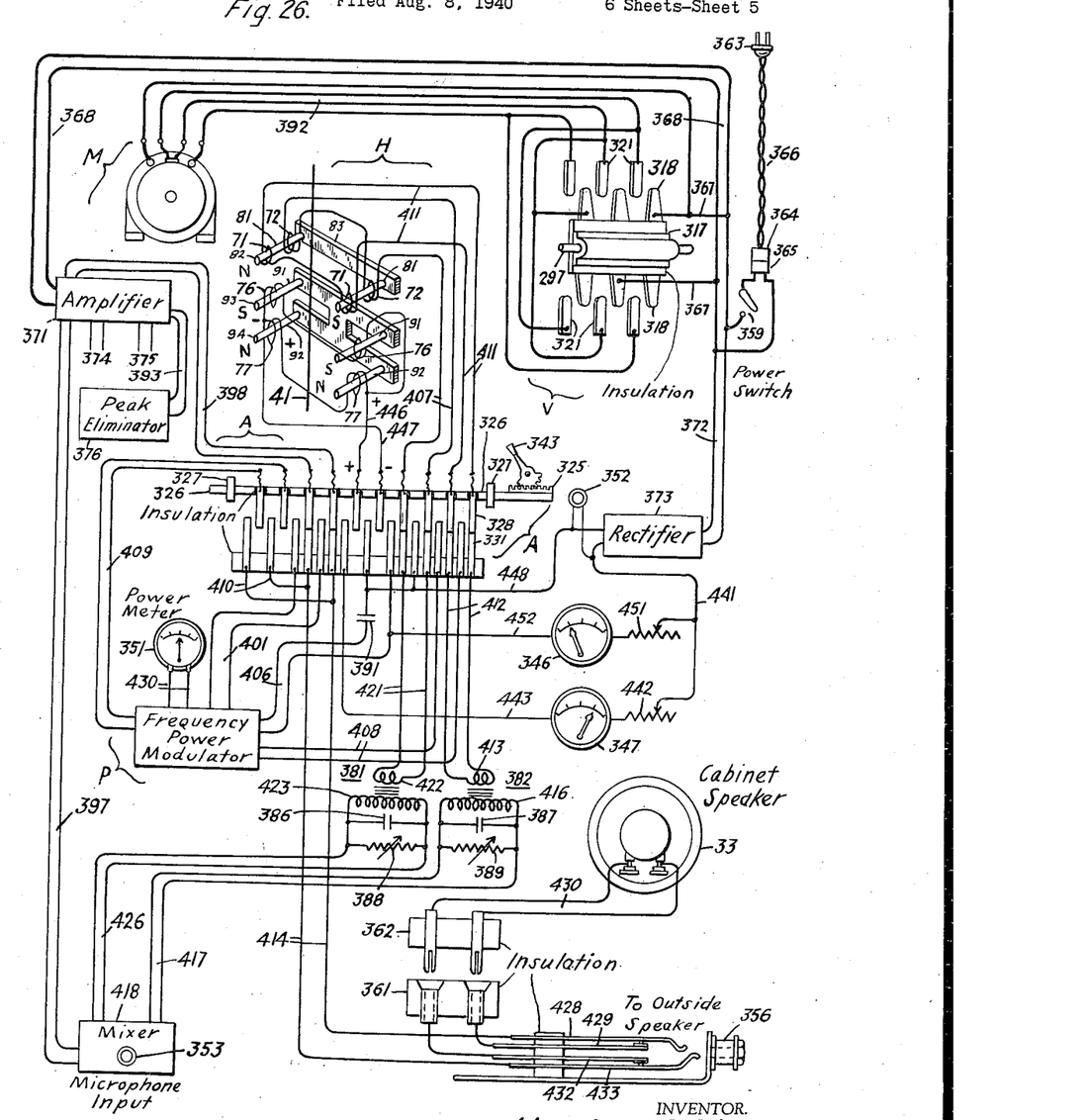
Fig. 26 is a diagram, and schematic plan, of the operating and control elements, and of the electrical and magnetic circuit means, of the device, the reels being omitted.

The block 63 is generally of simple oblong shape, having apertures of circular cross section through its width, arranged in horizontal pairs, with the apertures of the upper pair each containing two pulsating or alternating flux producing electro-magnet coils 71 and 72, see Figs. 19 and 26. These upper coils are the recording and reproducing coils, with the coils 72 also adapted to produce sustained flux superimposed on the pulsating flux thereof for agitating the magnetic condition of the wire 41, or conditioning it for better recording flux reception at the time of recording.

The lower four apertures in the block are arranged in substantial quadrature with one another, separated as a set from the upper apertures of the block by a greater distance than the distances between the apertures of the set, and each containing a single coil 76 or 77. The upper pair of lower apertures contain the coils 76, and the lowermost pair of apertures contain the coils 77.

The coils of each horizontal pair of apertures are offset vertically from each other in accordance with a corresponding relation, along the wire 41, of styli associated with the coils.

Figure 16:
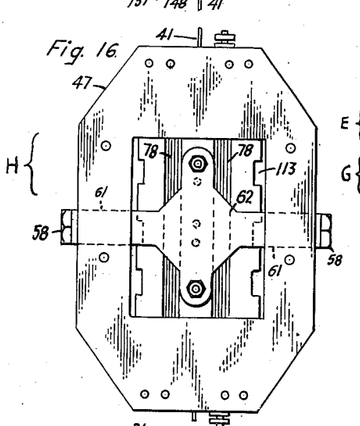
Fig. 16 is a view of the recording head, taken along the line 16—16 of Fig. 15, portions being omitted.
Figure 18:
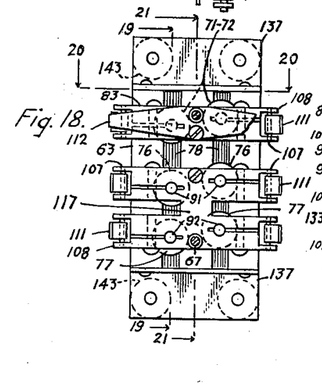
Fig. 18 is a rear view of portions of the device omitted from Fig. 16, portions of the latter figure being omitted from Fig. 18.

Vertical grooves 78, at the rear of the block 63, see Figs. 16, 18 and 19, provide for bringing the leads or wire ends of the coils out of the block.

Figures 22, 23, 24, 25:
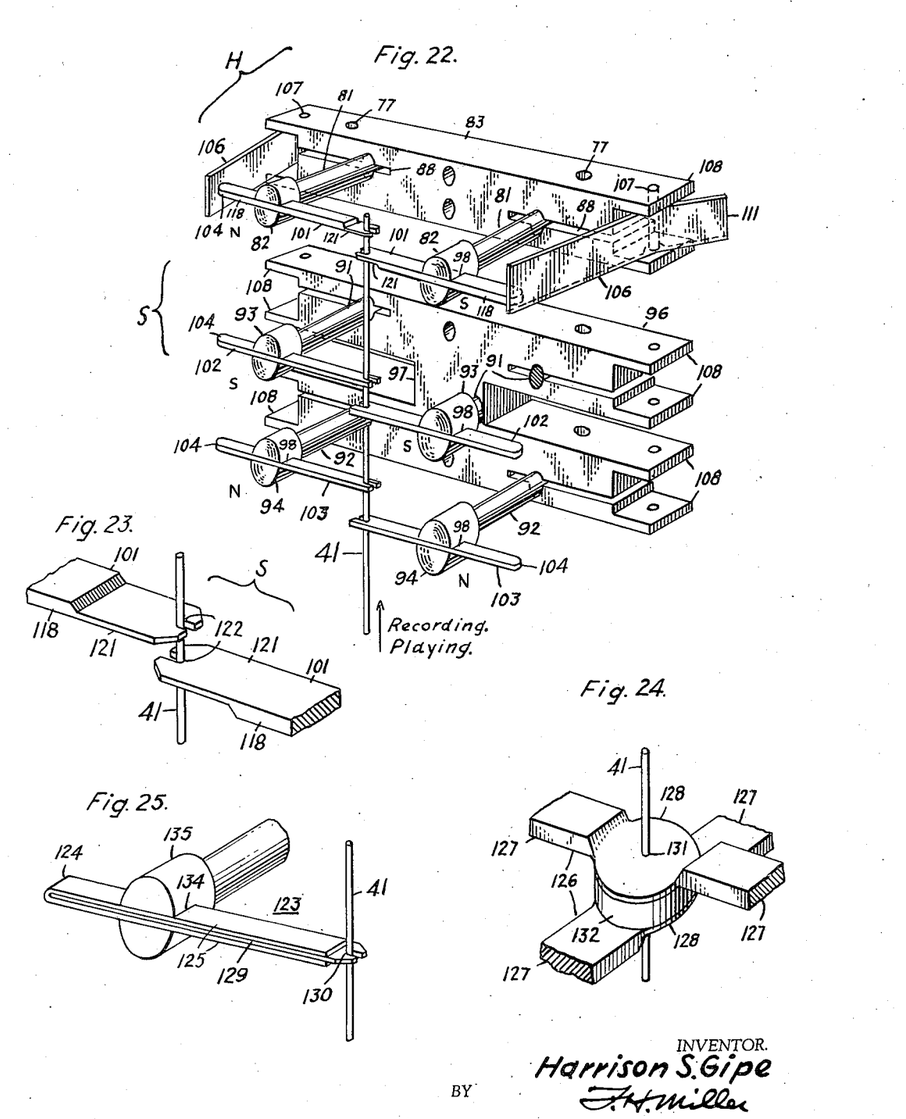
Fig. 22 is a considerably enlarged perspective front view of parts seen in front elevation in Fig. 14, but as better indicated in rear elevation in Fig. 18, parts of Figs. 14 and 18 being omitted.
Fig. 23 is a further greatly enlarged detail perspective view of parts of recording and reproducing stylus means seen near the top of Fig. 22.
Fig. 24 is a view, similar to Fig. 23, of a modified form of recording and reproducing stylus.
Fig. 25 is an enlarged perspective view of a combined stylus and core structure constituting a further modification of the invention.

A core member 81, extending through each of the upper, or recording and reproducing coils 71 and 72, see also Fig. 22, is provided with a head 82 for predetermined adjacent cooperation with one end of each coil 71 and 72, at the front of the recording head H, and is clamped to a magnetic flux path member or bar 83, as by screws 86 of Fig. 19, in holes 77 of Fig. 22; the bar 83 which links the opposite ends of the coils transversely to the axes thereof, being provided with slots 88 intercepted by grooves fitting the core members 81.

The heads 82 are marked N and S, respectively, indicating the polarity thereof, when the coils 72 are effecting sustained flux thereon.

Core members 91 and 92, similar to the core members 81, and likewise having heads 93 and 94, respectively, extend through the lower, or conditioning, coils 76 and 77, and are also clamped in a magnetic flux path member 96, the latter being structurally equivalent to two of the members 83 joined by a section 97, whereby the member 96 is of substantially H-shape, with its legs horizontal and its cross mid section vertical.

The conditioning coils 76 and 77 are arranged on the core members 91 and 92, and the member 96 is constructed, to render both pole heads 93 of such polarity, marked S, and both pole heads 94 of north polarity, marked N.

This arrangement subjects the wire 41 to conditioning, or record eradicating, flux over a definite or predetermined substantial extent of its length, in contradistinction to the spots, or small local indefinite lengths, to which the wires of former devices have been solely subjected; the distance being permissibly greater than the usual offset distance between adjacent cooperating recording styli.

The heads 82, 93 and 94 are alike, each having a horizontal slot 98 and, respectively, slidably supporting the pole members or styli S, including styli 101, 102 and 103, each longitudinally biased toward the recording element or wire 41, as by a non-magnetic lever 106, which bears, in this instance, against a rounded end 104 of the corresponding stylus. Each lever 106 is pivotally mounted by a non-magnetic pin 107, in bearing extensions 108 of the corresponding cross flux member 83 or 96.

Each of the levers 106 has a rear arm 111 engaged by a non-magnetic leaf spring 112, see particularly Figs. 17 and 19, secured to the corresponding cross flux member 83 or 96.

The arrangement is such that the levers 106 normally bias the styli toward the translating wire 41 and, when moved by hand against the spring action, may be locked in position by the spring clear of the styli, thereby facilitating removal and replacement of the styli and the wire.

The block 63 may have side grooves 113, see Figs. 14, 15, 16 and 20, providing clearance for the levers 106, and assisting in keeping the head small.

The longitudinal axes of the coils 71, 72, 76 and 77 lie transversely, or at right angles, to the wire 41, aside the latter, instead of heading axially into, or lying along, the wire, as in every other device of this kind of which I am aware.

This feature maintains the wire and styli particularly free from stray or fringe flux, and conduces to sharper recording and reproduction.

Figure 21:
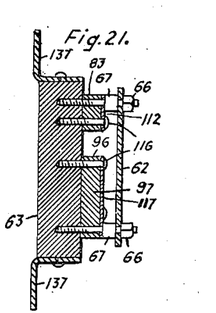
Fig. 21 is a view, taken substantially along the line 21—21 of Fig. 18.

As better seen in Fig. 21, the upper and lower springs 112, and the cross pieces 83 and 96, are each secured to the block 63, partially by the special screws 67, and partially by ordinary screws 116; the upper spring 112 being a simple elongated strap convergingly tapered at its edges toward its ends, and the lower spring 112 being the structural equivalent of two of the upper springs joined by a section 117, similar to the section 97 of the cross flux path member 96 of the conditioning coils.

*The styli*

Each recording and reproducing stylus 101 of the styli W, as better seen in Fig. 23, has body means or a portion 118 of given cross sectional area or thickness, and a sheet-like structure 121 homogeneously integral therewith, or extending therefrom, having uniform reduced section or thickness for a predetermined distance from the body means 118, or having edge contour 122 partially embracing the recorded element or wire 41; the portions 121 being offset from each other along the wire by a usual critical distance found desirable for good reception and transmission.

In the modified form of Fig. 24, recording and reproducing styli 126, corresponding to the styli 101, are similarly constructed to have body portions 127 of given cross sectional area or thickness, and a sheet-like structure 128 homogeneously integral therewith, or extending therefrom, having uniform reduced section or thickness for a predetermined distance from the body means 127, or having edge contour 131 completely embracing the translating or record element 41; the portions 128 being offset from each other along the wire by the above-mentioned critical distance, and held together in such spaced relation by a non-magnetic spacer or means 132.

The latter device is not especially adapted to the particular example of the invention given, but is adapted to its equivalent, except that the styli require the wire to be threaded therethrough, and do not move relative to each other.

The advantages of the uniform section stated are that uniform flux is maintained at the wire, irrespective of wear of the active ends of the styli, and that the openings, through which the wire extends, may be enlarged without affecting this section, as in styli having section which increases with wear.

As shown in Fig. 25, a stylus body means 123, of given cross-sectional area or thickness, is made up of an outer non-magnetic strap or element 124 bent to form layers or laminae 125, between which is disposed a very thin magnetizable strip 129, or sheet-like structure extending from the body 123, and having edge contour 130 for at least partially embracing the wire 41.

Disposed in slidable position in a slot 134 of a core member head 135, similar to the core member and head structures above set forth, and similarly operable, the stylus of this form presents its inner longitudinal thin edge to the head at the bottom of the slot 134 for the direct reception of magnetic flux from the head, and has its broad sides presented to this flux through the non-magnetic layers 125, thus offsetting the magnetic or flux lag between mutually heavy magnetizable bodies, and causing the magnetic and non-magnetic materials to transmit and control the flux relative to each other, and obtaining improved results.

Obviously, the non-magnetic layers 125 may be separate, or fixed to the head, and the magnetizable layer or strip 129 moved relative thereto, and the layers 125 also may be shorter, or only slightly longer than the slot 134, with short margins at the ends of the strips bent upwardly from the upper layer, and downwardly from the lower layer, for longitudinally locking strips in the slot, and any of a great many other changes made.

With the non-magnetic strips long, as shown, the composite structure has greater body, and the thin active end of the magnetizable layer is better supported.

Any of the head, core, cross flux member, and stylus parts may be made of thin section, or backed by or cooperating with, non-magnetizable material.

Figure 14:
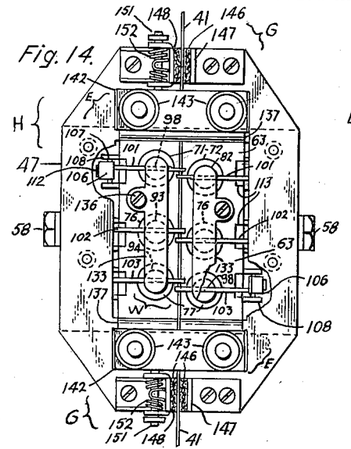
Fig. 14 is a view, enlarged to substantially full scale, of a recording head, as viewed near the right-hand side, about midway between the top and bottom, of Fig. 1.

As better seen in Figs. 14, 19, and 20, the styli W are maintained in the slots 98 by non-magnetic members 133 held to the block 63 by non-magnetic screws 136.

The damping structures

Angle members 137, at the top and bottom of the block 63, each support one of the damping structures E including felt strips 138, a non-magnetic metal strip 141 backing the forward felt strip 141, and a non-magnetic thumb nut device 143 for adjusting the tension of the spring 142 against the metal strips 141, and consequently, of the felt strips 138 against the wire 41.

The wire damping means G, at right angles to, and above and below the upper and lower damping means E, respectively, each comprises felt pads 146 at opposite sides of the wire, one of which is secured to a stationary non-magnetic arm 147 on the frame 47, and the other of which is carried by a non-magnetic arm 148 pivoted to the frame by a non-magnetic pin 151, and biased against the wire by a non-magnetic spring 152.

By this construction, the wire, irrespective of slight variations from the vertical position which it undergoes, because of variations in the diameters of the wound portions thereof on the respective reels, when wound from one to the other, is maintained constantly, smoothly and evenly damped, without bending it at any point between the reels, and the possibility of background noise from this source is therefore reduced or eliminated entirely.

The arrangement constitutes means for simultaneously damping both longitudinal and lateral movement of the recording wire, one example of lateral movement of which occurs, as better understood from Fig. 15, when the structure, mounted on the frame 47 by the pivot screws 58, turns about the axis of these screws, whereby the wire 41 moves laterally along, and between the felt pads 146, while traveling longitudinally between these pads, and is held in alinement with the styli W by the pads 138.

During the aforesaid variation of the position of the wire from the vertical, the entire recording head unit, pivotally mounted on the frame 47 by the screws 58, moves with the angular changes of the wire, thus avoiding changes of the positions of the styli relative to the wire.

The reel structure

Figure 9:
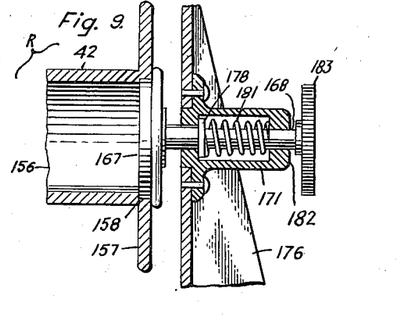
Fig. 9 is an enlarged detail view, partially in elevation and partially in section, of right-hand end portions of the upper reel and associated parts, as seen in Fig. 1.

In the wire supporting or reel structure R, as better seen in Figs. 1, 2, 3, 4, 5 and 9, the reels 42 and 43 are each constructed of light-weight non-magnetizable material, such as one piece of cast aluminum, having a hollow drum portion 156, thin-walled end disks 157, and annular rabbet groove-like end portions 158, see Fig. 9.

The drum 156 has apertures 161, see particularly Figs. 1, 3, and 4, joined by a longitudinal slot 162 of only slightly greater width than the diameter of the wire 41.

A small hollow cylinder or head member 163, of only slightly smaller outer diameter than the diameter of each aperture 161, is adapted to receive a small end length of the wire 41 in return bent double thickness through the cylinder 163. By reason of its resilience, the wire thus forms a loop 166 which locks the wire against outward pull from the cylinder.

When the cylinder, on the wire, is thrust through one of the apertures 161, as indicated as just having been done in Fig. 3, it may then be moved longitudinally of the drum to any desired position, with the wire protruding through the slot 162, ready for winding, but with the cylinder prevented from movement through the slot.

The arrangement thus constitutes self-locking means for attaching the end portion of the record element or wire to the reel against peripheral movement relative to the drum, but providing for movement therealong; this feature being important among the several items of advence and refinement in this device, which cooperate toward its more effective operation and manipulation, and other advantages.

The end grooves 158 constitute seats for engagement by end disks 167 which, at the right-hand ends of the reels, as viewed in Figs. 1 and 9, are attached to spindles 168 journaled in bearings 171 on a bracket 176 that is secured to the intermediate partition 36, or floor of the upper compartment structure U.

The guide rod 51 is fixed in position between the bracket 176 and a similar bracket 177 at the left-hand side of the reels.

Each spindle 168 has portions of different diameter providing a shoulder against which a washer-like member 178 is forced by a spring 181, surrounding the spindle between the member 178 and an outer end portion 182 of the bearing 171.

A handle 183 is provided on each of the spindles 168 for pulling the disks 167 out of the drum grooves 158 against the action of the springs 181; the arrangement greatly facilitating the removal and replacement of the reels.

A lower left-hand bearing 173 is similar to the right-hand bearings, except that the handle 183 and spring 181 are omitted, and a shaft 184 is substituted for the spindle 168.

Figures 6, 7, 8:
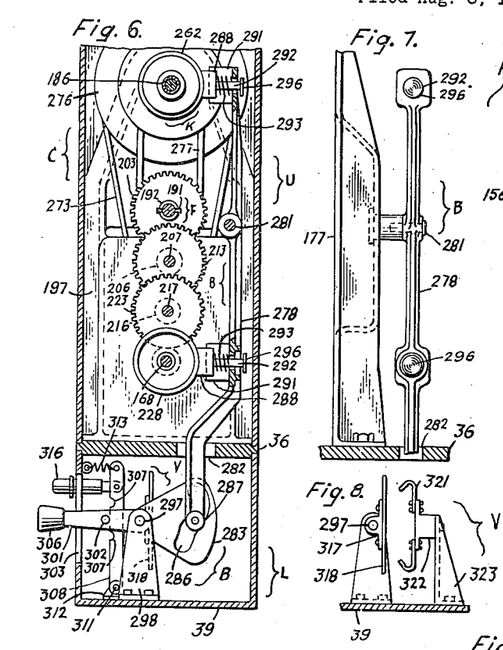
Fig. 6 is a view, similar to Fig. 2, taken substantially along the line 6—6 of Fig. 1.
Fig. 7 is a detail side elevation of a portion of a combined damping and braking device seen at the right hand side of Fig. 6, taken at right angles thereto, but omitting other parts of Fig. 6, and including a bracket not seen in Fig. 6.
Fig. 8 is a detail view, taken substantially along the line 8—8 of Fig. 1.
Figure 12:
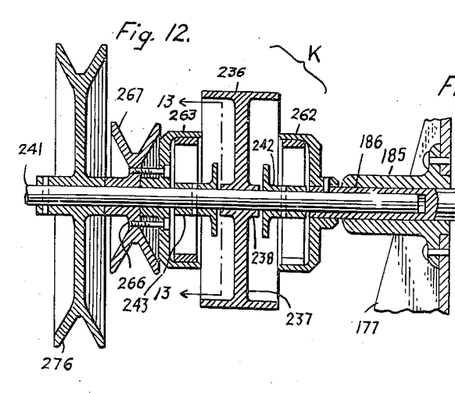
Fig. 12 is an enlarged detail central plane vertical section of a pulley and clutch device seen at the upper left center in Fig. 1.

An upper left-hand bearing 185 is also minus the handle 183 and spring 181, and instead of the spindle 168, is provided with a sleeve 186, see particularly Figs. 1, 6 and 12.

The reels 42 and 43 are each proportioned to render the fully wound record element or wire 41 thereon to be of substantially minimum diameter and maximum axial extent, for greater effectiveness according to the capacity, or time period of operation, of the particular machine; this feature reducing the number and frequency of reverse winding layers along the reels, rendering the operation of the feed screw 48 and the traveling nut 46 smoother, further avoiding the possibility of background noise, and being the prime factor in obtaining the compactness and readily portable character of the device as a whole.

Having the record element travel in the generally vertical direction, with the minimum departure from such direction provided by the reduced difference in diameter between the full and empty reels, also conduces to the production of a narrow, easily carried cabinet and, more importantly, reduces mechanical vibration of the active section of the wire between the reels, from shocks and jars, and avoids gravitational sag of this active section which, although microscopic in a taut section of the length shown, is nevertheless sufficient in a horizontal wire to have different pressure, wear and flux effects on the lower portion of a stylus or recording pole member than on the upper portion, especially in a larger machine. In the present case, there is no such unavoidable difference in the effects on the recording styli.

The axes of the reels, and the windings thereon are disposed substantially horizontally, and within predetermined horizontal limits relative to each other, one above the other, preventing gravity sag of the wire, and wear of the wire and styli therefrom, and maintaining the width of the unit within the proportions hereinbefore set forth.

The feed screw 48 is journaled in bearings 187 and 188 in the brackets 176 and 177, respectively, and has an extension, near the bracket 177, through which extends a pin 191, see Figs. 1 and 6, normally embraced by a slotted sleeve 192 on a shaft 193. The shaft 193 extends, through a bearing 196 in a bracket 197, to a knob 198, and carries a sleeve 201 between which and the bracket 197, a spring 202 surrounds the shaft 193 to bias the shaft to the right, as viewed in Fig. 1.

By pulling the knob 198 to the left, against the action of the spring 202, the screw 48 may be disconnected from its drive by the lower reel, through a set of speed-reducing gear wheels and pinions, for adjustment by hand, as when loading the reels with new wire.

This speed-reducing gear wheel and pinion set, comprises a gear wheel 203 on the shaft 193, a pinion 206 on a shaft 207 journaled in bearings 211 and 212 on the brackets 177 and 197, respectively, a gear wheel 213 on the shaft 207, a pinion 216 on a shaft 217 journaled in bearings 221 and 222 in the brackets 177 and 197, respectively, a gear wheel 223 on the shaft 217, and a pinion 226 on the shaft 184 of the lower left-hand reel bearing 171 that also is journaled in a bearing 27 in the bracket 197, and carries a damping and brake drum 228, and a pulley 231.

A tie rod 232 is connected between top extensions of the brackets 176, 177 and 197 to lend rigidity to the combined support of the brackets, all of which are mounted on, and secured to, the intermediate partition 36.

The clutch

Figure 13:
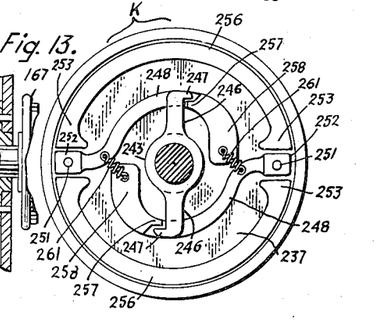
Fig. 13 is an enlarged view, taken substantially along the line 13—13 of Fig. 12.

The clutch K, as better seen in Figs. 1, 12 and 13, comprises a wheel 236 including a central rib or spider 237 having a hub 238 mounted about a shaft 241 for rotation relative thereto.

Hubs 242 and 243, at opposite sides of the spider 237, are fixed to the shaft 241, and each has diametrically oppositely projecting latch arms 246.

The clutch parts, at both the right and left of the spider 237, as viewed in Fig. 12, are alike, but operate reversely, and the parts at only one side, namely the left-hand side, are shown in Fig. 13, as taken along the line 13—13 of Fig. 12. Thus, the latch arms 246 at the left of the spider, shown in Fig. 13, have latch dogs 247 projecting clockwise from the latch arms 246. The latch arms, at the right of the spider, if superposed in dotted lines on the spider in Fig. 13, which has not been done, to avoid confusion, would project counterclockwise from the latch arms.

In each case, levers 248, pivoted to the spider by pins 251, each has a block-like portion 252, through which the corresponding pin 251 projects, and which is adapted, when turned about its pivot, to spread adjacent ends 253 of a pair of clutch shoes 256, which are similar to internal expanding brake shoes.

Each lever 248 further has a detent 257, for latching by the corresponding latch dog 247 during rotation of the shaft 241 in one direction, and an enlarged, or weighted, outer end portion 258 for action like a governor ball of a centrifugal control device.

The respective levers 248, at each side of the spider, are connected by springs 261 for ensuring positive return of the levers to latching position under all conditions, and irrespective of the location thereof about the shaft 241, when the rotation of the shaft is reversed from the direction in which the levers had been forcing the shoes outwardly.

Clutch drum members 262 and 263, at the right hand and left-hand sides, respectively, of the wheel 236, as viewed in Figure 12, which may be constructed from duplicate castings, but machined differently in accordance with their respective positions in the clutch, each comprises a peripheral portion for engagement by the corresponding shoes 256, an open side facing the wheel 236, and a closed side having a hub; the hub of the left-hand drum fitting the shaft 241, and the hub on the right-hand drum fitting, and fixed to, the sleeve 186. The left-hand drum is fixed, as by screws 266, to a small pulley 267, and both this drum and pulley are loosely mounted on the shaft 241. The right-hand drum 262 additionally constitutes a brake and damping drum element, as will further appear.

The drive mechanism

In the drive mechanism D, the motor M, of the alternating current type for operation on standard circuits, such as the usual circuit of one hundred and ten volts, is mounted on the intermediate partition 36, through a vibration absorbing device which, in this instance, includes a leaf spring 268 disposed between soft rubber standards or supports 271.

The spring 268 extends lengthwise from front to back of the cabinet C, with four of the upper rubber supports 271 grouped near the center of the spring and the motor, and a pair of the lower rubber supports near each end of the spring, thus substantially floatingly mounting the motor, and eliminating, or greatly reducing, the transmission of motor vibration to the support, including the partition 36 and other parts, common to the recording means, the recording element, and the motor.

A small pulley 272, on the shaft of the motor M, is connected, as by a V-belt 273, to a large pulley 276 fixed to the shaft 241, for selectively transmitting motion, through the clutch K, either directly to the upper reel 42, or through the small pulley 267, a V-belt 277, the small pulley 231, and the shaft 184, to the lower reel 43 depending upon the direction of rotation of the motor.

The braking and damping device

The combined braking and damping device B, in addition to the lower drum 228 on the shaft 168, and the drum 262 of the clutch K on the sleeve 186, comprises, as better seen in Figs. 6 and 7, a beam or lever 278 that is pivotally mounted, by a pin 281, on the bracket 177.

The beam extends from the upper compartment U, through a slot 282 in the partition 36, to the lower compartment L, for cooperation with a cam 283 having a slot 286, in which is disposed a follower 287 carried on the lower end of the beam.

Opposite each drum 228 and 262, the beam 278 carries a shoe 288, held vertically by side ears 291 on the beam, and carried by a pin 292 having very loose fit in an opening in the beam. A spring 293, around the pin 292 between the shoe and the beam, biases the shoe from the beam toward the drum, which bias is limited by a head 296 on the pin, holding the pin, the shoe and the spring to the beam.

The cam 283, pivotally carried by a pin 297 supported between brackets 298, has a lever arm 301 from which a pin 302 projects laterally in the lower compartment L. The arm 301 projects through a slot 303 in the front panel of the lower compartment, and carries a handle 306 outside the cabinet.

With the machine inactive, and the reels 42 and 43 stationary, the beam 278 is in the position, indicated in Fig. 7, in which both shoes 288 bear lightly against the drums 228 and 262, the handle 306 is in horizontal mid position, and the pin 302 is located midway between notches 307 in an upright lever arm 308. The latter is pivotally mounted by a pin 311 carried by a bracket 312 on the floor 39 of the lower compartment L, and is biased against the pin 302 by a spring 313 extending between the top end of the lever and the front panel. A button handle 316, pivotally connected to the lever 308, extends from the lever, through the front wall of the cabinet.

When the handle 306 is moved upwardly, to place the pin 302 in the upper notch 307, the cam 283 moves the beam 278 counterclockwise about the axis of its pivot pin 281, to release the lower shoe 288 from the drum 228, and to exert a damping force on the upper drum 262.

Under such condition, with the pin 302 held by the upper notch 307 in the lever arm 308, if the button 316 is pushed inwardly, the spring 293 of the upper shoe 288 will instantly force the cam 283 and the handle 306 to the intermediate or normal stationary braking position, shown in Figs. 1 and 6.

Conversely, when the handle 306 is moved downwardly to place the pin 302 in the lower notch 307, the cam 283 moves the beam 278 clockwise about the axis of its pivot pin 281, to release braking by the upper shoe 288 from the drum 262, and to exert the damping force on the lower drum 228. Again, with the pin 302 held by the lower notch 307 in the lever arm 308, if the button 316 is pushed, the spring 203 of the lower shoe 288 will instantly force the cam 283 and the handle 306 to the intermediate, or light braking, position.

The motor switch

The motor switch V, see particularly Figs. 1, 8, and 26, comprises an insulating support 317, carried by the shaft 297 of the device B, upon which are mounted contact members 318 for cooperation with stationary contact members 321, on an insulating member 322 secured to a bracket 323, that is fixed to the floor 39 of the lower compartment of the cabinet C.

Therefore, when the handle 306 is moved upwardly, as above set forth in connection with its damping and braking action, the movable contact members 318 engage the upper stationary contact members 321 to cause the motor M to rotate in one direction, and, when the handle 306 is moved downwardly, the movable contact members engage the lower stationary contact members to cause the motor to rotate in the opposite direction.

Thus, there is not only the double function of regulating the damping and braking in the one control device, but a third function of controlling the direction of rotation of the motor.

The master switch

The master switch A, see particularly Figs. 1, 10, 11, and 26, comprises a pinion 324 for operating a short rack 325 on a bar 326. The bar is supported in slides 327, and insulatingly carries and supports a plurality of contact members 328 for cooperative engagement with certain of stationary contact members 331, when the rack is moved in one direction, and for cooperative engagement with certain other of the contact members 331, when the rack is moved in the opposite direction.

Figure 10:
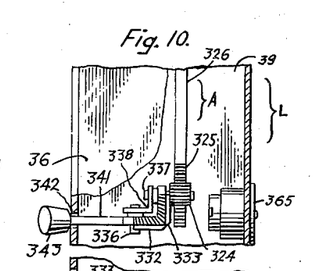
Fig. 10 is a detail top view of master switch operating means, the handle of which shows near the lower right hand portion of Fig. 1, and fragments of the cabinet.
Figure 11:
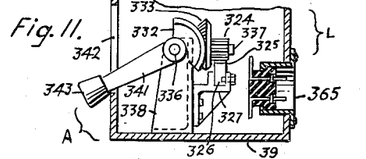
Fig. 11 is a view looking into Fig. 10 from the bottom, and at the handle from the right of Fig. 1.

Means for thus moving the rack, as better shown in Figs. 10 and 11, comprises cooperating segmental miter gear wheels 332 and 333 carried by shafts 336 and 337, respectively, that are journaled in a bracket 338 on the floor 39 of the lower compartment L.

The shaft 336 carries an arm 341, protruding through a slot 342 in the front panel or wall of the lower compartment, and having a handle 343. In the lower position of the handle 343, as indicated in Figs. 1, 10 and 11, the circuits of Fig. 26 are conditioned for playing or reproducing a record and, in the upper position of the handle, the circuits are conditioned for recording sound.

The front panel of the lower compartment further supports an ammeter 346 for indicating the current passing through the recording coils 71 and 72, an ammeter 347 for indicating the current passing through conditioning coils 76 and 77, a power meter 351, see Fig. 26, a signal lamp 352, a microphone or input jack 353, an output jack 356 for a speaker outside the cabinet, a volume control dial 357, a tone control dial 358, and a power switch 359.

A plug and socket connector, for cooperation with the jack 356, in selectively utilizing the cabinet speaker, or a speaker outside the cabinet, comprises a socket 361 secured to the intermediate partition 36 on the lower compartment structure L, and a plug 362 carried by the cover or upper compartment member U.

The Circuits

Figure 27:
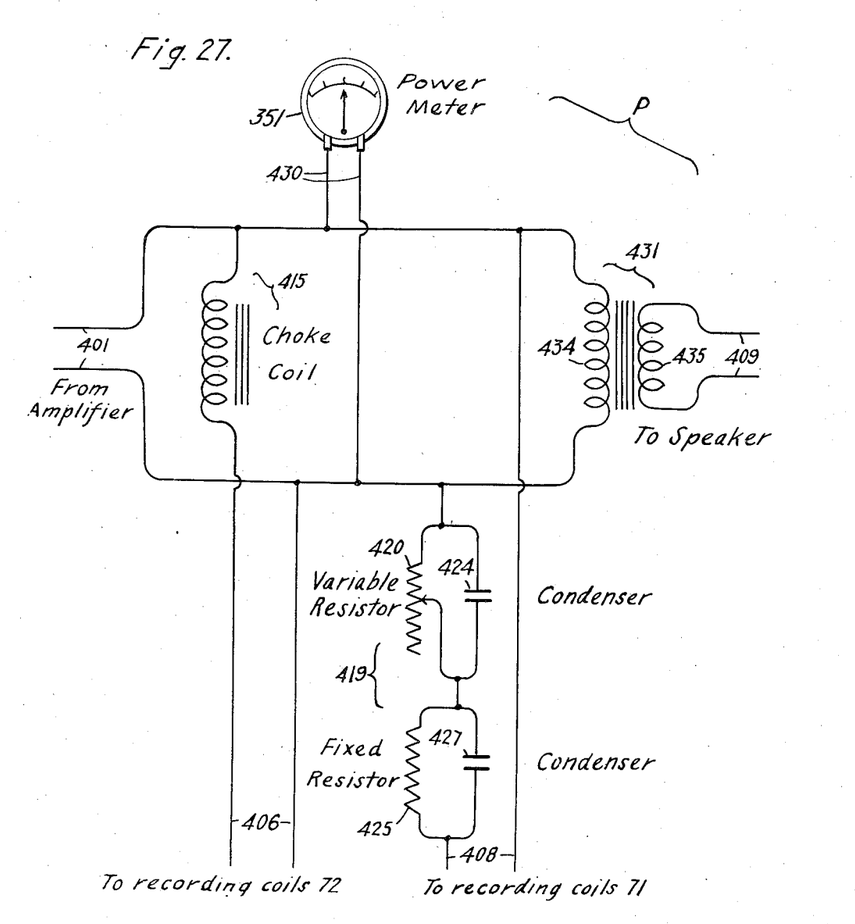
Fig. 27 is a similar diagram or plan of a flux frequency power modulator, of novel construction and operation, and in novel combination in the invention.

As indicated in Figs. 26 and 27, a plug 363, for attachment to a convenience outlet, of a source of electromotive force is connected by a service cord 366, and a socket 364 on the cord, to a plug 365 on the rear wall of the cabinet, see Figs. 10 and 11.

The plug 365 is connected to the power switch 359 at the front of the cabinet. From the power switch 359, conductors 367 lead to the motor switch V, conductors 368 lead to an amplifier 371, and conductors 372 lead to a rectifier 373. Conductors 374 and 375 extend from the amplifier to the volume and tone control dials 357 and 358, respectively of Fig. 1.

The amplifier 371, the rectifier 373, a flux peak eliminator 376, the flux frequency power modulator P, transformers 381 and 382, condensers 386 and 387, variable resistors 388 and 389, and a condenser 391, are all disposed in the lower compartment L of the cabinet C, for which the openings 38 provide ventilation, to avoid undue heat in the lower compartment from the amplifler and rectifier tubes, and other apparatus, and to prevent transfer of this heat to the recording compartment.

Conductors 392 are connected between the motor M and the motor switch V to energize and deenergize the motor, and to reverse the motion transmitted thereby.

The amplifier 371 is connected by conductors 393, to the peak eliminator 376, which operates to subdue flux surges caused by sudden impulses of sound, and to keep them in harmony with the prior and subsequent sounds, as they are when the sounds which cause the surges are produced farther from the microphone.

The eliminator thus operates to control the sound current to impose like effects on certain impulses of different frequency ranges, whereby to eliminate pulsation peaks from the recording flux.

Recording

In recording, the handle 346 of the master switch A is moved to upper position, to correspondingly move the contact members 328 one step to the left of the position shown in Fig. 26, and the handle 306 of the motor switch V is moved to upper position whereby to drive the upper reel 42 through the clutch K to cause the wire 41 to travel upwardly, or from the reel 43 to the reel 42.

During this operation, the double or reverse pitch screw 48, of the feed mechanism F, is driven from the lower reel 43, by the pull of the driven upper reel 42 on the wire 41, through the pinions, shafts and gear wheels 206—226, to cause the operation of laying the wire in uniform layers along the upper reel 42.

Sound current passes from the microphone jack 353, through conductors 397 to the amplifier 371, and from the latter, through conductors 396 to certain of the contact members 328 and 331 of the master switch A. The latter is shown in playing position, but when in recording position, with the movable contact members 328 one contact step to the left of the positions shown in Fig. 26, the sound current passes from the conductors 398 through the switch, to conductors 401, to the frequency modulator P.

From the modulator P, the sound current divides, one division passing through conductors 406, the condenser 391, the master switch A, and conductors 407, to the recording coils 72, and the other division passing through conductors 408, the master switch, and conductors 411, to the recording coils 71.

At the same time, direct current is superimposed on the alternating current of the recording coils 72, from the rectifier 373, through the conductor 441, the variable resistor 451, the ammeter 346, the conductor 452, the master switch A, one of the conductors 407, and returned to the rectifier through the other conductor 407, the master switch A, and the conductor 448, for subjecting the wire 41 to sustained conditioning flux simultaneously with its subjection to pulsating recording fluxes by the coils 71 and 72.

A third division of the sound current passes from the modulator P, through conductors 409, the master switch A, conductors 410, and conductors 414 to the jack 356, and from the latter to the outside speaker, or to the cabinet speaker 33, as will further appear, in order that the sounds being recorded may be heard at the time of recording.

Frequency power modulator

In the modulator P, Fig. 27, the conductors 406, and consequently, the recording coils 72, are rendered a low frequency circuit, by the inclusion of a choke coil 415, which completely blocks out high frequency sound current, and passes only low frequency sound current at reduced power.

The conductors 408, and the recording coils 71, are rendered a high frequency circuit, which allows the high frequency sound currents to be passed under high pressure, by a network 419, including a variable resistor 420 and a condenser 424 in parallel, and with these elements in series with a fixed resistor 425 in parallel with a condenser 427.

The above-described arrangement, whereby the low frequency sound currents are modulated, and high frequency sound currents are not similarly modulated in the modulator P, or whereby certain pulsations of certain frequency are modulated independently of other frequency ranges, thereby allows the high frequencies to be imposed on the recording coils at high power, or at a normal rate, while subduing the low frequencies, or allowing them to pass at a normal rate, and thus, operates differently from the eliminator 376, which affects all frequencies alike at any degree of power.

The power meter 351 is connected across the input conductors 401 from the amplifier 371, by conductors 430.

The conductors 409, to the speaker circuits, are provided with current at reduced voltage, by a step-down transformer 431 having a primary winding 434 connected across the input conductors 401, and a secondary winding 435 supplying the speaker circuit conductors 409.

While recording, the incoming sounds may be simultaneously reproduced on the cabinet speaker 33, or on an outside speaker, by passing of the sound current from the modulator P through the conductors 409, 410 and 414.

After recording, the handle 306 of the motor switch V is moved to lower position, to reverse the motor M, and to thereby drive the lower reel 43 through the clutch K and the belt 277, for rewinding the wire 41 from the upper reel 42 to the lower reel 43, which, in this instance is effected at a speed higher than the recording speed.

During the latter operation, the master switch handle 343 may be moved to the lower, or playing, position, in order that the inverted record sounds may be heard, or the rewinding may be effected in silence, by turning the handle of the volume control dial 357 to off position.

Also, during this operation, the feed screw 48 is reversely driven directly from the shaft 184 of the lower reel 43, through the pinions, shafts and gear wheels 206—226 above mentioned, to lay the wire uniformly along the lower reel 43.

Reproducing

In reproducing, the handle 343 of the master switch A, is moved to, or allowed to remain in, its lower, or playing, position, and the handle 306 of the motor switch V is moved to upper position, to again move the wire 41 upwardly.

The coils 71 and 72 are affected by the record element or wire 41 and, with the master switch A in the position shown in Fig. 26, current in the conductors 411 of the coils 71 passes through the master switch, and conductors 412, to a primary winding 413, of the transformer 382, and from a step-up secondary winding 416 of the transformer 382, through conductors 417, to a mixer 418 associated with the microphone input.

Likewise, current in the conductors 407 of the coils 72 passes through the master switch and conductors 421, to a primary winding 422 of the transformer 381, and from a step-up secondary winding 423 of the transformer 381, through conductors 426 to the mixer 418.

From the mixer 418, the reproducing current passes through the conductors 397 to the amplifier 371, and from the latter, through the conductors 398 and the master switch A, to conductors 414 and the jack 356.

At the jack 356, if the outside speaker is not connected, as indicated, the reproducing current passes through conducting strips 428, 429, 432 and 433, to the socket 361, and from the latter, to the plug 362 and conductors 430 to the cabinet speaker 33.

If the outside speaker is connected, the strips 428 and 429 are disconnected from each other, as also are the strips 432 and 433, so that the reproducing current, instead of passing to the cabinet speaker 33, as above stated, passes directly from the strips 428 and 433 to the outside speaker.

*Magnetic conditioning*

To remove an old record from the wire 41, and magnetically condition it for a new record, the master switch A is moved from the playing position shown in Fig. 26, to recording position one contact space to the left, and direct current from the rectifier 373 derived, in this instance, from the same source as the pulsating recording current from the amplifier 371, passes along a conductor 441, through a variable resistor 442 and the ammeter 347, along a conductor 443, through the master switch A, through a conductor 446 to the coils 76 and 77 in parallel, through a conductor 447 and the master switch, and along a conductor 448 to the negative terminal of the direct-current side of the rectifier 373; the circuit thus traced being blocked from the alternating-current circuits by the condenser 391.

At the same time, direct current also passes from the rectifier along the conductor 441, through a variable resistor 451 and the ammeter 346, along a conductor 452, through the master switch, along one of the conductors 407, through the recording coils 72, along the other conductor 407, through the master switch, along the conductor 448 to the negative terminal of the direct current side of the rectifier 373, the current thus traced also being blocked from the alternating-current circuits by the condenser 391.

This conditioning operation may be effected separately, or while recording, wherein an old record is effaced from the upwardly moving wire 41 at the lower portion of the head H, opposite the coils 76 and 77, and the new record is immediately effected by the coils 71 and 72 at the upper portion of the head.

I claim as my invention:

1. In a sound device, a magnetizable translating element, means for flux cooperation therewith along a path thereof in accordance with sounds, and means for magnetically conditioning said element to receive a record including pole means spaced from each other along said element each including a plurality of pole members of like polarity cooperating with said element at opposite sides of said path.

2. In a sound device, a magnetizable filamentary translating element, means for flux cooperation therewith in accordance with sounds, and means at each side of said flux cooperation means along the element for damping mechanical vibrations of the element, each including means engaging the element at positions spaced from each other about and along the element.

3. In a sound device, a magnetizable filamentary translating element, means for flux cooperation therewith in accordance with sounds, means including reels for interchangeably winding said element, reversible drive means for the reels, and a single means for braking both reels during inaction thereof and alternately releasing the braking action and effecting a stronger damping action on the respective reels during rotation thereof.

4. In a sound device, a magnetizable filament, and a recording head comprising a flux circuit including core portions, elongated pole members longitudinally slidably engaging the core portions and extending laterally to the filament, and means including a coil for each core portion spaced from the filament along, and axially extending transversely to, its pole member.

5. A sound device comprising a magnetizable filament, elongated pole members longitudinally relatively movable laterally to the filament disposed substantially end-to-end having filament engaging ends in slightly offset relation to each other along the filament, means for resiliently biasing said pole members against the filament, and magnet means for the pole members including a coil for each pole member spaced from the filament along, and axially extending transversely to, its pole member, and an axially extending core for each coil relative to which the corresponding pole member moves transversely during said longitudinal movement.

6. In a sound device, a magnetizable filament, and means for magnetically conditioning said filament including pole means cooperating with the filament at positions spaced from each other along the filament, each including a plurality of pole portions of the same polarity opposite to the polarity of the corresponding portions of the other and engaging the filament at substantially opposite sides.

7. In a sound device, a magnetizable filament, and means for magnetically conditioning the filament including pole means cooperating with the filament at positions spaced from each other along the filament, each including a pair of elongated pole members in substantially end-to-end relation longitudinally relative to each other laterally of the filament and having end portions of the same polarity opposite to the polarity of the corresponding end portions of the other pair cooperating with each other to substantially surround the filament, and means for resiliently biasing said pole members relative to each other against the filament.

8. In a sound device, a pair of reels, a magnetizable filament for interchangeable winding by the reels, a recording head cooperating with the filament between the reels, a carriage for said head, means for reversing travel of the carriage parallel to the reels during passage of the filament through the head in either direction between the reels, means for mounting the head on the carriage for angular movement relative thereto in accordance with changes in position of the filament between the reels resulting from changes in the diameter of filament windings on the reels, means on the head for damping movement of the filament and movable with the head in said angular movement, and means on the carriage independently of the head for damping movement of the filament and providing for said angular movement.

9. In a sound device, a pair of reels, a magnetizable filament for interchangeable winding by the reels, a recording head cooperating with the filament between the reels, a carriage for said head, means for reversibly moving the carriage parallel to the reels during passage of the filament through the head in either direction between the reels, means for mounting the head on the carriage for angular movement relative thereto in accordance with changes in position of the filament between the reels resulting from changes in the diameters of filament windings on the reels, means on the head at both ends thereof along the filament for damping movement of the latter and movable with the head in said angular movement, and means on the carriage adjacent to each of said ends independently of the head for damping movement of the filament and providing for said angular movement.

10. In a sound device, a magnetizable filament, a recording head, a reel for winding the filament through the head, means for rotatably mounting the reel including cooperating bearing surface portions supported on the reel and the mounting means, respectively, at each end of the reel locking the reel and the mounting means radially together entirely around the axis of said bearing portions, at least one of said bearing surface portions being movable out of its bearing position while retained in supported position prior to removal of the reel from the device provided for by said movement, and means providing for placing the filament in position in the head and removing the filament from said position by movements of the filament transversely to its length.

11. In a sound device, a magnetizable filament, a recording head, a reel for winding the filament through the head, means for rotatably mounting the reel including a support and a shaft at each end of the reel cooperating between the reel and the corresponding end support, at least one of said shafts being movable longitudinally for releasing the reel and providing for its removal laterally from the supports, and means providing for placing the filament in position in the head and removing the filament from said position by movements of the filament transversely to its length.

12. In a sound device, a magnetizable filament, a recording head, a reel for winding the filament through the head, means for rotatively mounting the reel including a support at each end of the reel, a shaft journaled in each support having an inner end element releasably fitting a portion on the corresponding end of the reel in radial locking operative position relative thereto, at least one of said shafts being longitudinally movable, means for longitudinally moving said longitudinally movable shaft in one direction for relatively moving the shafts and the reel longitudinally together into operative relation and in the opposite direction for releasing the reel for removal from the supports and the device, and means providing for placing the filament in position in the head and removing the filament from said position by movements of the filament transversely to its length.

13. In a sound device, a magnetizable filament, a recording head, a reel for the filament, and means including an element adjacent to one end of the filament and guide means extending along the reel to receive said element for positively locking the filament according to the position of the head longitudinally to the reel and providing for movement of the filament transversely to its length along the reel according to variations of said position while so locked.

14. In a sound device, a recording head, a member having an aperture therethrough, a magnetizable filament having an end length extending through said aperture from one side of said member and a loop at the opposite side of the member of not substantially greater diameter than said aperture, a portion of said length extending from the loop through said aperture from said opposite side, a reel for the filament including a hollow drum having a longitudinal slot through the drum wall of only slightly greater width than the diameter of the filament and an opening through said wall communicating with the slot, said opening being shaped similar to the contour of said member laterally of the filament but of slightly greater area whereby, when said end length and member are inserted through said opening loop end first and released, the member locks at said one side against the inside of the drum and may be moved along the slot to position corresponding to the position of the head and returned to the opening for withdrawal therefrom.

15. In a sound device, a magnetizable filament, and a recording head including a coil, a core for the coil, an elongated pole member for end engagement with the filament laterally thereto and having longitudinal slidable engagement with said core transversely thereto, a spring, and a lever movable between a position transmitting force of the spring to the pole member biasing the latter against the filament and a position in which the spring holds the lever clear of the path of movement of the pole member.

16. In a sound device, a pole member having a body portion of given cross-sectional area and a sheet-like portion homogeneously integral with said body portion having uniform reduced section to a predetermined position from said body portion, and a magnetizable filament extending substantially normal to an extension of the plane of said sheet adjacent to said position.

17. In a sound device, a pair of pole members each having a body portion of given cross-sectional area and a sheet-like portion homogeneously integral with said body portion having uniform reduced section extending to a predetermined position from said body portion, said sheet-like portions being disposed in overlapping side relation but providing an opening substantially normal to the planes of the sheets through the overlapping portions, and a magnetizable filament extending through said opening substantially surrounded by said sheet-like portions.

HARRISON S. GIPE.